United States Patent
Park et al.

(10) Patent No.: US 7,151,134 B2
(45) Date of Patent: Dec. 19, 2006

(54) DYNAMIC VULCANIZATION OF POLYURETHANE ELASTOMERIC MATERIAL IN THE PRESENCE OF THERMOPLASTICS

(75) Inventors: Edward Hosung Park, Saline, MI (US); Francis Joseph Walker, Tecumseh, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 232 days.

(21) Appl. No.: 10/463,801

(22) Filed: Jun. 17, 2003

(65) Prior Publication Data

US 2004/0260023 A1    Dec. 23, 2004

(51) Int. Cl.
C08G 69/26 (2006.01)
C08F 283/04 (2006.01)
B32B 27/00 (2006.01)

(52) U.S. Cl. ............... 524/606; 525/420; 525/424; 525/453; 525/460; 428/423.1; 428/474.4

(58) Field of Classification Search ............... None
See application file for complete search history.

(56) References Cited

U.S. PATENT DOCUMENTS

| | | | |
|---|---|---|---|
| 3,037,954 A | 6/1962 | Gessler et al. | |
| 4,035,565 A | 7/1977 | Apotheker et al. | |
| 4,287,320 A | 9/1981 | Kolb | |
| 4,419,499 A * | 12/1983 | Coran et al. | 525/424 |
| 4,450,263 A | 5/1984 | West | |
| 4,656,228 A * | 4/1987 | Richter et al. | 525/433 |
| 4,696,976 A * | 9/1987 | Ellerbe et al. | 525/126 |
| 4,696,989 A | 9/1987 | Oka et al. | |
| 4,787,991 A | 11/1988 | Morozumi et al. | |
| 5,206,293 A | 4/1993 | Sakai et al. | |
| 5,354,811 A | 10/1994 | Kamiya et al. | |
| 5,384,374 A | 1/1995 | Guerra et al. | |
| 5,585,152 A * | 12/1996 | Tamura et al. | 428/35.1 |
| 6,066,697 A | 5/2000 | Coran et al. | |
| 6,310,141 B1 | 10/2001 | Chen et al. | |
| 6,407,174 B1 | 6/2002 | Ouhadi | |
| 6,429,249 B1 | 8/2002 | Chen et al. | |
| 6,437,030 B1 | 8/2002 | Coran et al. | |
| 6,624,251 B1 | 9/2003 | Chmielewski | |

FOREIGN PATENT DOCUMENTS

| EP | 0 168 020 A2 | 9/1985 |
|---|---|---|
| EP | 0 168 020 B1 | 10/1989 |

OTHER PUBLICATIONS

English Translation of JP 2000-079928 obtained from JPO website Mar. 2000.*
"Fluorine-Containing Polymers", Encyclopedia of PolymerScience & Engineering, 2$^{nd}$ Edition, vol. 7, pp. 256-267.
"Polyurethanes", Encyclopedia of Polymer Science & Engineering, 2$^{nd}$ Edition, vol. 13, pp. 274-278.
Web Page, Dyneon™ Fluorothermoplastics, pp. 1-2, downloaded May 8, 2003.
Technical Information, "Viton® fluoroelastomer", pp. 1-17, 1998.
AFLAS™ The Fluoroelastomer, pp. 1-8, Asahi Glass Co., web site downloaded Apr. 11, 2003.
Web page, Tetrafluoroethylene-propylene rubber, pp. 1-3, unknown date.
Schmiegel, Walter W., "A Review of Recent Progress in the Design and Reactions of Base-Resistant Fluoroelastomers.", IRC, Jul. 2003.
Michael J. Moore, "Silanes as Rubber-to-Metal Bonding Agents", 160th Meeting of the Rubber Division, American Chemical Society, Cleveland Ohio, Paper No. 105, pp. 1-17, 2001.

* cited by examiner

*Primary Examiner*—Philip C. Tucker
(74) *Attorney, Agent, or Firm*—Ronald W. Wangerow; Harness, Dickey & Pierce, P.L.C.

(57) ABSTRACT

A thermoplastically processable cured rubber composition comprises a crosslinked or cured urethane polymer dispersed in a matrix made of a thermoplastic polymeric material. In one aspect, the matrix forms a continuous phase and the crosslinked urethane polymer is in the form of particles forming a non-continuous phase. The processable rubber compositions can be made by a process of dynamic vulcanization of a urethane prepolymer material in the presence of the thermoplastic matrix material. The process involves combining a urethane prepolymer, a curing agent capable of reacting with the urethane prepolymer, and a thermoplastic material to form a mixture, and heating the mixture at a temperature and for a time sufficient to effect reaction between the curing agent and the prepolymer. Mechanical energy is supplied to the mixture during the heating step so that the crosslinking or curing of the urethane prepolymer occurs while the prepolymer and thermoplastic are undergoing a mixing.

11 Claims, No Drawings

DYNAMIC VULCANIZATION OF POLYURETHANE ELASTOMERIC MATERIAL IN THE PRESENCE OF THERMOPLASTICS

FIELD OF THE INVENTION

The present invention relates to thermoprocessable compositions containing cured polyurethane elastomers. It also relates to seal and gasket type material made from the compositions and methods for their production by dynamic vulcanization techniques.

BACKGROUND OF THE INVENTION

Cured elastomeric materials have a desirable set of physical properties typical of the elastomeric state. They show a high tendency to return to their original sized and shape following removal of a deforming force, and they retain physical properties after repeated cycles of stretching, including strain levels up to 1000%. Based on these properties, the materials are generally useful for making shaped articles such as seals and gaskets.

Because they are thermoset materials, cured elastomeric materials can not generally be processed by conventional thermoplastic techniques such as injection molding, extrusion, or blow molding. Rather, articles must be fashioned from elastomeric materials by high temperature curing and compression molding. Although these and other rubber compounding operations are conventional and known, they nevertheless tend to be more expensive and require higher capital investment than the relatively simpler thermoplastic processing techniques. Another drawback is that scrap generated in the manufacturing process is difficult to recycle and reuse, which further adds to the cost of manufacturing such articles.

Articles made from elastomeric materials, such as seals and gaskets, may be subject to a wide variety of challenging environmental conditions, including exposure to high temperature, contact with corrosive chemicals, and high wear conditions during normal use. For example, bearing seals for automotive applications see high temperature in normal use and are exposed to lubricating fluids containing basic compounds and other corrosive materials. They are also subject to wear and abrasion from the moving parts they act to seal. Accordingly, it is desirable to make such articles from materials that combine elastomeric properties and stability or resistance to the environmental conditions.

Crosslinked polyurethane materials have excellent physical properties, such as high tensile strength and wear resistance, compared with other cross linked elastomeric materials. However, they are usually limited to a continuous service temperature of only up to about 100° C. In some applications, the relatively low heat resistance of the polyurethane materials is a drawback that narrows the potential use of the materials. For example, they are generally unsuitable for use in some automotive applications, where the in service use can be 150° C. or higher.

It would therefore be desirable to provide materials having excellent physical properties in combination a high level of heat resistance. In addition, it would be desirable to provide such materials that are readily recyclable and that can be processed by conventional thermoplastic processing techniques.

SUMMARY OF THE INVENTION

A thermoplastically processable cured rubber composition comprises a crosslinked or cured urethane polymer dispersed in a matrix. The matrix is made of a thermoplastic polymeric material, and the composition may be processed into an article with a tensile strength that exceeds the tensile strength of the thermoplastic polymeric material. In one aspect, the matrix forms a continuous phase and the crosslinked urethane polymer is in the form of particles forming a non-continuous phase.

The processable rubber compositions can be made by a process of dynamic vulcanization of a urethane prepolymer material in the presence of the thermoplastic matrix material. In one aspect, the method involves combining a urethane prepolymer, a curing agent capable of reacting with the urethane prepolymer, and a thermoplastic material to form a mixture, and heating the mixture at a temperature and for a time sufficient to effect reaction between the curing agent and the prepolymer. Mechanical energy is supplied to the mixture during the heating step so that the crosslinking or curing of the urethane prepolymer occurs while the prepolymer and thermoplastic are undergoing a mixing.

In a preferred embodiment, the method involves mixing the prepolymer and thermoplastic material for a time and at a shear rate sufficient to form a dispersion of the prepolymer in a continuous thermoplastic phase. A dispersion of prepolymer in thermoplastic is formed, wherein the prepolymer particles are preferably about 50 micrometers in diameter or less. When a proper dispersion is formed, a curing agent is added to the dispersion while continuing the mixing, and the mixture is heated while continuing the mixing.

The processable compositions may be formed into cured elastomeric materials useful for example as gaskets, seals, O-rings, and hoses. Advantageously, the compositions may be processed by standard thermoplastic techniques such as blow molding and compression molding, avoiding the use of slow thermoset and possibly high temperature rubber processing conditions. Scrap material generated during the manufacture of the shaped articles may be readily recycled and reused, because the material can be processed as a conventional thermoplastic.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENTS

The following description of the preferred embodiment(s) is merely exemplary in nature and is in no way intended to limit the invention, its application, or uses.

The invention provides a thermoplastically processable rubber composition, shaped articles made from the rubber composition, and methods for compounding the rubber composition and forming the shaped article. The processable rubber composition contains a crosslinked urethane polymer dispersed in a matrix, wherein the matrix comprises a thermoplastic polymeric material. The rubber compositions of the invention can be formed into articles that exhibit desirable elastomeric properties, yet can also be processed by standard thermoplastic methods such as injection molding, blow molding, and extrusion.

According to one aspect of the invention, the matrix forms a continuous phase in which the crosslinked urethane polymer is in the form of particles forming a non-continuous or discrete phase. In another aspect, the matrix thermoplastic polymeric material and the crosslinked urethane polymer form co-continuous phases.

The rubber compositions of the invention are prepared by reacting a urethane prepolymer (also called a "polyurethane prepolymer") with a curing agent while stirring or otherwise mechanically mixing the prepolymer and curing agent in the presence of a thermoplastic polymeric material. The thermoplastic material comprises a polymeric material that softens and flows upon heating. The prepolymer reacts with the curing agent to form the crosslinked urethane polymer of the invention. The prepolymer is generally a polymer of a polyisocyanate and a polyol and/or polyamine. It may be isocyanate-functional or hydroxyl-functional, and can have a wide variety of molecular weights and chemical structure, according to the desired properties of the rubber composition, as discussed below.

A preferred method for making rubber compositions comprises the steps of combining a urethane prepolymer, a curing agent capable of reacting with the urethane prepolymer, and a thermoplastic material to form a mixture, and heating the mixture at a temperature and for a time sufficient to effect a reaction between the curing agent and the prepolymer, while supplying mechanical energy to mix the mixture during the heating step.

In another aspect, the preparation of the rubber compositions is carried out by mixing the prepolymer and the thermoplastic material in the presence of the curing agent, and heating during the mixing to effect cure of the prepolymer in the presence of the thermoplastic material. In yet another aspect, the method comprises mixing the prepolymer and the thermoplastic material for a time and at a shear rate sufficient to form a dispersion of the prepolymer in a continuous thermoplastic phase. When a proper dispersion is formed, the curing agent may be added to the dispersion while continuing the mixing. The combination of the prepolymer, curing agent, and thermoplastic material is then heated during mixing. During the mixing and heating, the prepolymer and curing agent react to form a crosslinked urethane polymer.

Shaped elastomeric articles may be readily prepared from the rubber compositions of the invention by conventional thermoplastic processing methods. The shaped elastomeric materials contain a crosslinked urethane polymer dispersed in a matrix made of a thermoplastic polymeric material. The shaped elastomeric articles exhibit a desirable combination of properties such as flexibility, softness, and compression set. In one embodiment, the shaped articles are especially suitable for such application as seals, gaskets, and O-rings, as well as extruded articles such as hoses.

The polyurethane prepolymers may be described as the reaction product of one or more polymeric polyols, one or more polyisocyanate compounds, and, optionally, one or more chain extension agents.

Depending on the nature and molar amounts of the components used, the prepolymers may be isocyanate functional or hydroxyl functional, and can take on a wide variety of molecular weights. In the case of the thermoplastic polyurethanes, the prepolymer may also be one with essentially equal amounts of hydroxyl and isocyanate functionality. The prepolymers are reacted with the curing agent in the presence of the thermoplastic polymeric material to form the crosslinked urethane polymer of the rubber compositions of the invention. In a preferred embodiment, the urethane prepolymer is a polymer of a polyisocyanate and a polyester polyol. Accordingly, the crosslinked urethane polymer formed from the reaction of prepolymer and curing agent may also be described as a polymer of a polyisocyanate and a polyester polyol.

In one embodiment, an isocyanate functional prepolymer is reacted with a curing agent in the presence of the thermoplastic material. The isocyanate prepolymer is prepared according to known methods by reacting a polymeric polyol with a polyisocyanate compound, optionally in the presence of one or more lower molecular weight chain extension agents. The amounts of polyisocyanate and polyol components are chosen such that there is an excess of isocyanate. The precise amounts of polyisocyanate, polymeric polyol, and chain extender are selected according to known principles in order to achieve elastomers of desired physical properties. It is possible to synthesize an isocyanate functional prepolymer from individual polyisocyanate and polyol components. Alternatively, many isocyanate functional prepolymers are available as commercial products.

The curing agent for reaction with isocyanate functional prepolymers is generally a hydroxyl functional component or an amine functional component. Hydroxyl functional components, or polyols, react with the isocyanates on the isocyanate functional prepolymer to form urethane linkages in the cured urethane polymer. Amine-functional components form urea linkages upon reaction with the isocyanate groups of the prepolymer. Preferred diol curing agents include 1,4-butanediol and hydroquinone di-(beta-hydroxyethyl) ether (HQEE). In one aspect, the polyol used as curing agent for the isocyanate functional prepolymers has a hydroxyl functionality of greater than 2. For example, a triol such as glycerol may be used, or a mixture of diols and triols may be used. The reaction product of a polyol of functionality greater than 2 with the isocyanate functional urethane prepolymer is a crosslinked urethane elastomer similar in structure to known cast polyurethane elastomers.

The type of curing agent can affect the overall physical properties of the final product. Amine functional curing agents tend to react too fast with the isocyanate groups of the prepolymer, so useful amines tend to be sterically hindered (such as diethyl toluene diamine or the Diak® line of curing agents) or electronically modified for slower reaction (such as the well known methylene-bis-(ortho-chloroaniline) or MOCA).

In another aspect, the polyol used as curing agent for the isocyanate functional prepolymers has a functionality of about 2. In this case, the cured urethane polymer formed is similar in properties to the known thermoplastic polyurethanes.

Rubber compositions of the invention may also be made by reacting a hydroxyl functional prepolymer with a curing agent capable of reacting with the prepolymer. Hydroxyl functional prepolymers are made from similar components as with the isocyanate functional prepolymers, except that a molar access of hydroxyl component over isocyanate component is used in the synthesis. The hydroxyl functional prepolymers tend to have lower molecular weight than the isocyanate functional prepolymers. As was the case with the isocyanate functional prepolymers, the amount of polymeric polyol, chain extension agent, and polyisocyanate may be chosen according to known principles depending on the desired physical properties of the resulting crosslinked urethane polymer.

In one embodiment the hydroxyl functional prepolymers are crosslinked by reacting with a curing agent comprising a polyisocyanate compound. Any of the polyisocyanate compounds discussed below, such as diisocyanates, may be used as the crosslinking agent for the hydroxyl functional prepolymers. In a preferred embodiment, the polyisocyanate curing agent is toluene diisocyanate. In a preferred embodiment, either the hydroxyl functional prepolymer, the polyisocyanate crosslinking agent, or both has a functionality greater than 2, so that upon reaction, a thermoset kind of reaction product is formed containing intra- and interchain crosslinks. Hydroxyl functional prepolymers with a functionality of greater than 2 may be readily synthesized by including an amount of triols, such as glycerol or trimethylolpropane, among the components used to synthesize the prepolymer. Polyisocyanate compounds with a functionality of greater than 2 are also readily available. Examples include polymeric diisocyanates such as polymeric MDI, as well as trimers of diisocyanates such as isocyanurates.

Hydroxyl functional prepolymers, which in some embodiments are also known as millable gums, may also in a preferred embodiment be crosslinked by peroxides. Conventional organic peroxides may be used. Non-limiting examples include alkyl peroxides and dicumyl peroxide. The peroxide crosslinking agent reacts with active hydrogens on the urethane prepolymer backbone to form a crosslinked urethane polymer containing interchain links. Active hydrogens in the hydroxyl functional prepolymers include the alpha carbon of a diacid component used to form a polyester polyol, and a methylene hydrogen of methylene phenyl diisocyanate (MDI). For this reason, a preferred hydroxyl functional prepolymer is based on a diisocyanate component including MDI.

Examples of high molecular weight polyol components of the prepolymers of the invention include polyester polyols, polyether polyols, polylactone polyols, polytetrahydrofuran polyols, and polycarbonate polyols.

Polyester diols may be prepared by the condensation polymerization of polyacid compounds and polyol compounds. Preferably, the polyacid compounds and polyol compounds are di-functional, i.e., diacid compounds and diols are used to prepare substantially linear polyester diols, although minor amounts of mono-functional, tri-functional, and higher functionality materials (perhaps up to 5 mole percent) can be included. Suitable dicarboxylic acids include, without limitation, glutaric acid, succinic acid, malonic acid, oxalic acid, phthalic acid, hexahydrophthalic acid, adipic acid, maleic acid and mixtures of these. Suitable polyols include, without limitation, wherein the extender is selected from the group consisting of ethylene glycol, diethylene glycol, triethylene glycol, tetraethylene glycol, propylene glycol, dipropylene glycol, tripropylene glycol, tetrapropylene glycol, cyclohexanedimethanol, 2-ethyl-1,6-hexanediol, Esterdiol 204 (sold by Eastman Chemical Co.), 1,4-butanediol, 1,5-pentanediol, 1,3-propanediol, butylene glycol, neopentyl glycol, and combinations thereof. Small amounts of triols or higher functionality polyols, such as trimethylolpropane or pentaerythritol, are sometimes included. In a preferred embodiment, the carboxylic acid includes adipic acid and the diol includes 1,4-butanediol. Typical catalysts for the esterification polymerization are protonic acids, Lewis acids, titanium alkoxides, and dialkyltin oxides.

Polylactone diols are polyesters formed by polymerizing a cyclic lactone monomer. They can be prepared by reacting an initiator with a lactone or alkylene oxide chain-extension reagent. The initiator contains active hydrogens. Examples include diols such as ethylene glycol and propylene glycol. Preferred chain-extension reagents are ε-caprolactone, ethylene oxide, and propylene oxide. Lactones that can be ring opened by an active hydrogen are well-known in the art. Examples of suitable lactones include, without limitation, ε-caprolactone, γ-caprolactone, β-butyrolactone, β-propiolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is ε-caprolactone. Lactones useful in the practice of the invention can also be characterized by the formula:

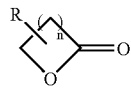

wherein n is a positive integer of 1 to 7 and R is one or more H atoms, or substituted or unsubstituted alkyl groups of 1–7 carbon atoms. Useful catalysts include those mentioned above for polyester synthesis. Alternatively, the reaction can be initiated by forming a sodium salt of the hydroxyl group on the molecules that will react with the lactone ring.

Polyether polyols contain repeating units derived from alkylene oxides. They are typically prepared by reacting an initiator containing active hydrogens with an oxirane-containing compound. Commonly used initiators include water and diols such as ethylene glycol and propylene glycol. The oxirane-containing compound is preferably an alkylene oxide or cyclic ether, especially preferably a compound selected from ethylene oxide, propylene oxide, butylene oxide, tetrahydrofuran, and combinations of these. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The alkylene oxide polymerization is typically base-catalyzed. The polymerization may be carried out, for example, by charging the hydroxyl-functional initiator and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition and polymerized in blocks by sequential addition. Homopolymers or copolymers of ethylene oxide or propylene oxide are preferred.

Polytetrahydrofuran polyols are polymers of tetrahydrofuran, usually formed by ring opening homopolymerization of tetrahydrofuran. Tetrahydrofuran polymerizes under known conditions to form repeating units of —[CH$_2$CH$_2$CH$_2$CH$_2$O]—. Tetrahydrofuran is polymerized by a cationic ring-opening reaction using such counterions as SbF$_6^-$, AsF$_6^-$, PF$_6^-$, SbCl$_6^-$, BF$_4^-$, CF$_3$SO$_3^-$, FSO$_3$, and ClO$_4^-$. Initiation is by formation of a tertiary oxonium ion. The polytetrahydrofuran segment can be prepared as a "living polymer" and terminated by reaction with the hydroxyl group of a diol such as any of those mentioned above.

Aliphatic polycarbonate diols are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In one embodiment, the polymeric diol preferably has a number average molecular weight (determined for example by the ASTM D-4274 method) of from about 300 to about 4,000; more preferably from about 400 to about 3,000; and still more preferably from about 500 to about 2,000.

Chain extension agents include preferably difunctional and trifunctional low molecular weight compounds containing hydroxyl groups, amino groups, or a combination of hydroxyl and amino groups. Non-limiting examples of diols include ethylene glycol, propylene glycol, 1,6-hexanediol, cyclohexanedimethanol, 2-ethyl-1,6-hexanediol, 1,4-butanediol, neopentyl glycol, 1,4-butanediol, and neopentyl glycol. Diamines include ethylene diamine and hexanediamine. Amino alcohols include alkanolamines such as ethanolamine and propanolamine.

Useful diisocyanate compounds used to prepare the urethane prepolymers of the invention include, without limitation, isophorone diisocyanate (IPDI), methylene bis-4-cyclohexyl isocyanate ($H_{12}$ MDI), cyclohexane diisocyanate (CHDI), m-tetramethyl xylene diisocyanate (m-TMXDI), p-tetramethyl xylene diisocyanate (p-TMXDI), ethylene diisocyanate, 1,2-diisocyanatopropane, 1,3-diisocyanatopropane, 1,6-diisocyanatohexane (hexamethylene diisocyanate or HDI), 1-4-cyclohexanebis (methylene isocyanate) (BDI), 1,4-butylene diisocyanate, lysine diisocyanate, 1,4-methylene bis(cyclohexyl isocyanate), bitolylene diisocyanate (TODI), 1-6-diisocyanato-2,2,4,4-tetramethylhexane (TMDI), 1,3-bis(isocyanatomethyl)cyclohexane ($H_6$XDI), 1,6-diisocyanto-2,4,4,-trimethylhexane, the various isomers of toluene diisocyanate, meta-xylylenediisocyanate, para-xylylenediisocyanate, 4-chloro-1,3-phenylene diisocyanate, naphthalene diisocyanate, 1,5-tetrahydro-naphthalene diisocyanate, 4,4'-dibenzyl diisocyanate, 1,2,4-benzene triisocyanate, 1,4-diisocyanato benzene, xylylene diisocyanate (XDI), and combinations thereof. Particularly useful is diphenylmethane diisocyanate (MDI). In another preferred embodiment naphthalene diisocyanate (NDI) is used as the diisocyanate. Polymers of naphthalene diisocyanate tend to have superior high temperature properties. Other preferred isocyanate compounds include TDI and TODI.

As noted above, an amount of trifunctional hydroxyl materials may be employed to introduce a corresponding amount of branching in the polyurethane elastomer. Non-limiting examples of trifunctional polyols include trimethylolpropane, 1,2,6-hexanetriol and glycerol. In addition, a small amount of mono-functional compounds may be employed where desired to control molecular weight or to offer other advantages. Preferably the amount of trifunctional polyols or mono-functional compounds employed would be 5% or less based on the total weight of the reaction product.

The reaction of the polyisocyanate, polymeric diol, and chain extension agent to form the prepolymer is typically conducted by heating the components, for example by melt reaction in a twin screw extruder. Typical catalysts for this reaction include organotin catalysts such as stannous octoate. Generally, the ratio of polymeric diol, polyisocyanate, and chain extension agent can be varied within a relatively wide range depending largely on the desired prepolymer functionality and hardness of the final polyurethane elastomer. For example, the equivalent proportion of polyester polyol to chain extension agent may be within the range of 1:0 to 1:12 and, more preferably, from 1:1 to 1:8.

The thermoplastic material making up the matrix of the invention is a polymeric material that softens and flows upon heating. In one aspect, a thermoplastic material is one the melt of which can be measured, such as by ASTM D-1238 or D-2116 at a temperature above its melting point The thermoplastic material of the invention may be selected to provide enhanced properties of the rubber/thermoplastic combination at elevated temperatures, preferably above 100° C. and more preferably at about 150° C. and higher. Such thermoplastics include those that maintain physical properties, such as at least one of tensile strength, modulus, and elongation at break to an acceptable degree at the elevated temperature. In a preferred embodiment, the thermoplastics possess physical properties at the elevated temperatures that are superior (i.e. higher tensile strength, higher modulus, and/or higher elongation at break) to those of the cured polyurethane rubber at a comparable temperature.

The thermoplastic polymeric material used in the invention may be a thermoplastic elastomer. Thermoplastic elastomers have some physical properties of rubber, such as softness, flexibility and resilience, but may be processed like thermoplastics. A transition from a melt to a solid rubber-like composition occurs fairly rapidly upon cooling. This is in contrast to convention elastomers which hardens slowly upon heating. Thermoplastic elastomers may be processed on conventional plastic equipment such as injection molders and extruders. Scrap may generally be readily recycled.

Thermoplastic elastomers have a multi-phase structure, wherein the phases are generally intimately mixed. In many cases, the phases are held together by graft or block copolymerization. At least one phase is made of a material that is hard at room temperature but fluid upon heating. Another phase is a softer material that is rubber like at room temperature.

Some thermoplastic elastomers have an A-B-A block copolymer structure, where A represents hard segments and B is a soft segment. Because most polymeric materials tend to be incompatible with one another, the hard and soft segments of thermoplastic elastomers tend to associate with one another to form hard and soft phases. For example, the hard segments tend to form spherical regions or domains dispersed in a continuous elastomer phase. At room temperature, the domains are hard and act as physical crosslinks tying together elastomeric chains in a 3-D network. The domains tend to lose strength when the material is heated or dissolved in a solvent.

Other thermoplastic elastomers have a repeating structure represented by $(A-B)_n$, where A represents the hard segments and B the soft segments as described above.

Many thermoplastic elastomers are known. They in general adapt either the A-B-A triblock structure or the $(A-B)_n$ repeating structure. Non-limiting examples of A-B-A type thermoplastic elastomers include polystyrene/polysiloxane/polystyrene, polystyrene/polyethylene-co-butylene/polystyrene, polystyrene/polybutadiene/polystyrene, polystyrene/polyisoprene/polystyrene, poly-α-methyl styrene/polybutadiene/poly-α-methyl styrene, poly-α-methyl styrene/polyisoprene/poly-α-methyl styrene, and polyethylene/polyethylene-co-butylene/polyethylene.

Non-limiting examples of thermoplastic elastomers having a $(A-B)_n$ repeating structure include polyamide/polyether, polysulfone/polydimethylsiloxane, polyurethane/polyester, polyurethane/polyether, polyester/polyether, polycarbonate/polydimethylsiloxane, and polycarbonate/polyether. Among the most common commercially available thermoplastic elastomers are those that contain polystyrene as the hard segment. Triblock elastomers are available with polystyrene as the hard segment and either polybutadiene, polyisoprene, or polyethylene-co-butylene as the soft segment. Similarly, styrene butadiene repeating co-polymers are commercially available, as well as polystyrene/polyisoprene repeating polymers.

In a preferred embodiment, a thermoplastic elastomer is used that has alternating blocks of polyamide and polyether. Such materials are commercially available, for example from Atofina under the Pebax® trade name. The polyamide blocks may be derived from a copolymer of a diacid component and a diamine component, or may be prepared by homopolymerization of a cyclic lactam. The polyether block is generally derived from homo- or copolymers of cyclic ethers such as ethylene oxide, propylene oxide, and tetrahydrofuran.

Other useful thermoplastic polymers are solid, generally high molecular weight, plastic materials. Preferably, these polymers are crystalline or semi-crystalline polymers, and more preferably have a crystallinity of at least 25 percent as measured by differential scanning calorimetry. Amorphous polymers with a suitably high glass transition temperature are also acceptable as the thermoplastic polymers. The resin also preferably has a melt temperature or glass transition temperature in the range from about 80° C. to about 350° C., but the melt temperature should generally be lower than the decomposition temperature of the thermoplastic vulcanizate.

Non-limiting examples of thermoplastic polymers include polyolefins, polyesters, nylons, polycarbonates, styrene-acrylonitrile copolymers, polyethylene terephthalate, polybutylene terephthalate, polyamides, polystyrene, polystyrene derivatives, polyphenylene oxide, polyoxymethylene, and fluorine-containing thermoplastics. The thermoplastics may be amorphous or semi-crystalline. In a preferred embodiment, the glass transition temperature Tg of an amorphous thermoplastic is 150° C. or higher, and the melting point of a semi-crystalline or crystalline thermoplastic is about 150° C. or higher.

Polyolefins are formed by polymerizing α-olefins such as, but not limited to, ethylene, propylene, 1-butene, 1-hexene, 1-octene, 2-methyl-1-propene, 3-methyl-1-pentene, 4-methyl-1-pentene, 5-methyl-1-hexene, and mixtures thereof. Copolymers of ethylene and propylene or ethylene or propylene with another α-olefin such as 1-butene, 1-hexene, 1-octene, 2-methyl-1-propene, 3-methyl-1-pentene, 4-methyl-1-pentene, 5-methyl-1-hexene or mixtures thereof are also contemplated. These homopolymers and copolymers may be synthesized by using any polymerization technique known in the art such as, but not limited to, the "Phillips catalyzed reactions," conventional Ziegler-Natta type polymerizations, and metallocene catalysis including, but not limited to, metallocene-alumoxane and metallocene-ionic activator catalysis.

Polyester thermoplastics contain repeating ester linking units in the polymer backbone. In one embodiment, they contain repeating units derived from low molecular weight diols and low molecular weight diacids. Non-limiting examples include the commercially available grades of polyethylene terephthalate and polybutylene terephthalate. Alternatively, the polyesters may be based on aliphatic diols and aliphatic diacids. Exemplary here the copolymers of ethylene glycol or butanediol with adipic acid. In another embodiment, the thermoplastic polyesters are polylactones, prepared by polymerizing a monomer containing both hydroxyl and carboxyl functionality. Polycaprolactone is a non-limiting example of this class of thermoplastic polyester.

Polyamide thermoplastics contain repeating amide linkages in the polymer backbone. In one embodiment, the polyamides contain repeating units derived from diamine and diacid monomers such as the well known nylon 66, a polymer of hexamethylene diamine and adipic acid. Other nylons may be prepared by varying the size of the diamine and diacid components. Non-limiting examples include nylon 610, nylon 612, nylon 46, and nylon 6/66 copolymer. In another embodiment, the polyamides are prepared by polymerizing a monomer with both amine and carboxyl functionality. Non-limiting examples include nylon 6 (polycaprolactam), nylon 11, and nylon 12. Other polyamides made from diamine and diacid components include the high temperature polyterephthalamide polymers containing repeating units derived from diamines and aromatic diacids such as terephthalic acid. Commercially available examples of these include PA6T (a copolymer of hexanediamine and terephthalic acid), sold by Solvay or DuPont under the Amodel or Zytel HT tradenames, respectively and PA9T (a copolymer of nonanediamine and terephthalic acid), sold by Kuraray under the Genestar tradename.

Other non-limiting examples of high temperature thermoplastics include polyphenylene sulfide, liquid crystal polymers, and high temperature polyimides. Liquid crystal polymers are based chemically on linear polymers containing repeating linear aromatic rings. Because of the aromatic structure, the materials form domains in the nematic melt state with a characteristic spacing detectable by x-ray diffraction methods. Examples of materials include copolymers of hydroxybenzoic acid, or copolymers of ethylene glycol and linear aromatic diesters such as terephthalic acid or naphthalene dicarboxylic acid.

High temperature thermoplastic polyimides include the polymeric reaction products of aromatic dianhydrides and aromatic diamines. They are commercially available from a number of sources. Exemplary is the copolymer of 1,4-benzenediamine and 1,2,4,5-benzenetetracarboxylic acid dianydride.

Thermoplastic fluorine-containing polymers may be selected from a wide range of polymers and commercial products. The polymers are melt processable—they soften and flow when heated, and can be readily processed in thermoplastic techniques such as injection molding, extrusion, compression molding, and blow molding. The materials are readily recyclable by melting and re-processing.

The thermoplastic polymers may be fully fluorinated or partially fluorinated. Fully fluorinated thermoplastic polymers include copolymers of tetrafluoroethylene and perfluoroalkyl vinyl ethers. The perfluoroalkyl group is preferably of 1 to 6 carbon atoms. Other examples of copolymers are PFA (copolymer of TFE and perfluoropropyl vinyl ether) and MFA (copolymer of TFE and perfluoromethyl vinyl ether). Other examples of fully fluorinated thermoplastic polymers include copolymers of TFE with perfluoroolefins of 3 to 8 carbon atoms. Non-limiting examples include FEP (copolymer of TFE and hexafluoropropylene).

Partially fluorinated thermoplastic polymers include E-TFE (copolymer of ethylene and TFE), E-CTFE (copolymer of ethylene and chlorotrifluoroethylene), and PVDF (polyvinylidene fluoride). A number of thermoplastic copolymers of vinylidene fluoride are also suitable thermoplastic polymers for use in the invention. These include, without limitation, copolymers with perfluoroolefins such as hexafluoropropylene, and copolymers with chlorotrifluoroethylene.

Thermoplastic terpolymers may also be used. These include thermoplastic terpolymers of TFE, HFP, and vinylidene fluoride.

These and other fluorine-containing thermoplastic materials are commercially available. Suppliers include Dyneon (3M), Daikin, Asahi Glass Fluoropolymers, Solvay/Ausimont and DuPont.

In a preferred embodiment, plasticizers, extender oils, synthetic processing oils, or a combination thereof may be used in the compositions of the invention. The type of processing oil selected will typically be consistent with that ordinarily used in conjunction with the specific rubber or rubbers present in the composition. The extender oils may include, but are not limited to, aromatic, naphthenic, and paraffinic extender oils. Preferred synthetic processing oils include polylinear α-olefins.

In addition to the elastomeric material, the thermoplastic polymeric material, and curative, the processable rubber compositions of this invention may include other additives such as stabilizers processing aids, curing accelerators, fillers, pigments, adhesives, tackifiers, and waxes. The properties of the compositions and articles of the invention may be modified, either before or after vulcanization, by the addition of ingredients that are conventional in the compounding of rubber, thermoplastics, and blends thereof.

A wide variety of processing aids may be used, including plasticizers and mold release agents. Non-limiting examples of processing aids include Caranuba wax, phthalate ester plasticizers such as dioctylphthalate (DOP) and dibutylphthalate silicate (DBS), fatty acid salts such as zinc stearate and sodium stearate, polyethylene wax, and keramide. In some embodiments, high temperature processing aids are preferred. Such include, without limitation, linear fatty alcohols such as blends of $C_{10}$–$C_{28}$ alcohols, organosilicones, and functionalized perfluoropolyethers. In some embodiments, the compositions contain about 1 to about 15% by weight processing aids, preferably about 5 to about 10% by weight.

Non-limiting examples of fillers include both organic and inorganic fillers such as, barium sulfate, zinc sulfide, carbon black, silica, titanium dioxide, clay, talc, fiber glass, fumed silica and discontinuous fibers such as mineral fibers, wood cellulose fibers, carbon fiber, boron fiber, and aramid fiber (Kevlar). The addition of carbon black, extender oil, or both, preferably prior to dynamic vulcanization, is particularly preferred. Non-limiting examples of carbon black fillers include SAF black, HAF black, SRP black and Austin black. Carbon black improves the tensile strength, and an extender oil can improve processability, the resistance to oil swell, heat stability, hysteresis, cost, and permanent set. In a preferred embodiment, fillers such as carbon black may make up to about 40% by weight of the total weight of the compositions of the invention. Preferably, the compositions comprise 1–40 weight % of filler. In other embodiments, the filler makes up 10 to 25 weight % of the compositions.

The crosslinked or cure urethane polymer, also referred to herein generically as a "rubber", is generally present as small particles within a continuous thermoplastic polymer matrix. A co-continuous morphology is also possible depending on the amount of rubber relative to thermoplastic material, the cure system, the mechanism and degree of cure of the elastomer, and the amount and degree of mixing. Preferably, the urethane polymer is fully crosslinked/cured.

The full crosslinking can be achieved by adding an appropriate curative or curative system to a blend of thermoplastic material and urethane prepolymer, and curing the urethane prepolymer to the desired degree under conventional curing conditions. In a preferred embodiment, the prepolymer is crosslinked or cured by the process of dynamic vulcanization. The term dynamic vulcanization refers to a vulcanization or curing process for a rubber contained in a thermoplastic composition, wherein the curable rubber (here the urethane prepolymer) is vulcanized under conditions of sufficiently high shear at a temperature above the melting point of the thermoplastic component. Under dynamic vulcanization conditions, the rubber is simultaneously crosslinked or cured and dispersed as particles within the thermoplastic matrix. Dynamic vulcanization is effected by mixing the elastomeric and thermoplastic components at elevated temperature in the presence of a curative in conventional mixing equipment such as roll mills, Moriyama mixers, Banbury mixers, Brabender mixers, continuous mixers, mixing extruders such as single and twin-screw extruders, and the like. An advantageous characteristic of dynamically cured compositions is that, notwithstanding the fact that the elastomeric component is fully cured, the compositions can be processed and reprocessed by conventional plastic processing techniques such as extrusion, injection molding and compression molding. Scrap or flashing can be salvaged and reprocessed.

Heating and mixing or mastication at vulcanization temperatures are generally adequate to complete the vulcanization reaction in a few minutes or less, but if shorter vulcanization times are desired, higher temperatures and/or higher shear may be used. A suitable range of vulcanization temperature is from about the melting temperature of the thermoplastic material (typically 120° C.) to about 300° C. or more. Typically, the range is from about 150° C. to about 250° C. A preferred range of vulcanization temperatures is from about 180° C. to about 220° C. It is preferred that mixing continue without interruption until vulcanization of the urethane prepolymer occurs or is complete.

After dynamic vulcanization, a homogeneous mixture is obtained, wherein the rubber (comprising the crosslinked or cured urethane polymer) is in the form of small dispersed particles essentially of an average particle size smaller than about 50 μm, preferably of an average particle size smaller than about 25 μm, more preferably of an average size smaller than about 10 μm or less, and still more preferably of an average particle size of 5 μm or less.

The progress of the cure during the dynamic vulcanization may be followed by monitoring mixing torque or mixing energy requirements during mixing. The mixing torque or mixing energy curve generally goes through a maximum after which mixing can be continued somewhat longer to improve the fabricability of the blend. If desired, one can add additional ingredients, such as the stabilizer package, after the dynamic vulcanization is complete. The stabilizer package is preferably added to the thermoplastic vulcanizate after vulcanization has been essentially completed, i.e., the curative has been essentially consumed.

The processable rubber compositions of the invention may be manufactured in a batch process or a continuous process.

In a batch process, predetermined charges of urethane prepolymer, thermoplastic material and curative agents are added to a mixing apparatus. In a typical batch procedure, the prepolymer and thermoplastic material are first mixed, blended, masticated or otherwise physically combined until a desired particle size of prepolymer is provided in a continuous phase of thermoplastic material. When the structure of the elastomeric material is as desired, a curative agent may be added while continuing to apply mechanical energy to mix the elastomeric material and thermoplastic material.

Curing is effected by heating or continuing to heat the mixing combination of thermoplastic and prepolymer in the presence of the curative agent. When cure is complete, the processable rubber composition may be removed from the reaction vessel (mixing chamber) for further processing.

It is preferred to mix the prepolymer and thermoplastic material at a temperature where the thermoplastic material softens and flows. If such a temperature is below that at which the curative agent is activated, the curative agent may be a part of the mixture during the initial particle dispersion step of the batch process. In some embodiments, a curative is combined with the prepolymer and polymeric material at a temperature below the curing temperature. When the desired dispersion is achieved, the temperature may be increased to effect cure. However, if the curative agent is activated at the temperature of initial mixing, it is preferred to leave out the curative until the desired particle size distribution of the prepolymer in the thermoplastic matrix is achieved. In another embodiment, curative is added after the prepolymer and thermoplastic material are mixed. Thereafter, in a preferred embodiment, the curative agent is added to a mixture of prepolymer particles in thermoplastic material while the entire mixture continues to be mechanically stirred, agitated or otherwise mixed.

Continuous processes may also be used to prepare the processable rubber compositions of the invention. In a preferred embodiment, a twin screw extruder apparatus, either co-rotation or counter-rotation screw type, is provided with ports for material addition and reaction chambers made up of modular components of the twin screw apparatus. In a typical continuous procedure, thermoplastic material and a solid prepolymer are combined by inserting them into the screw extruder together in a first hopper using a feeder (loss-in-weight or volumetric feeder). Temperature and screw parameters may be adjusted to provide a proper temperature and shear to effect the desired mixing and particle size distribution of the uncured prepolymer in a thermoplastic material matrix. The duration of mixing may be controlled by providing a longer or shorter length of extrusion apparatus or by controlling the speed of screw rotation for the mixture of prepolymer and thermoplastic material to go through during the mixing phase. The degree of mixing may also be controlled by the mixing screw element configuration in the screw shaft, such as intensive, medium or mild screw conditions. Then, at a downstream port, by using a side feeder (loss-in-weight or volumetric feeder), the curative agent may be added continuously to the mixture of thermoplastic material and prepolymer as it continues to travel down the twin screw extrusion pathway. Downstream of the curative additive port, the mixing parameters and transit time may be varied as described above. By adjusting the shear rate, temperature, duration of mixing, mixing screw element configuration, as well as the time of adding the curative agent, processable rubber compositions of the invention may be made in a continuous process.

When the prepolymer is a liquid (which is usually the case with the typical cast elastomer components), the thermoplastic material may be melted in the screw extruder, and the liquid prepolymer injected with a liquid injector into the molten thermoplastic. The curative agent may then be added downstream of the prepolymer liquid injector. Alternatively, the liquid prepolymer and curative agent may be combined for a brief period before injecting the combination of prepolymer and curative into the molten thermoplastic. The temperature and duration of this combining prior to injection into the molten thermoplastic are chosen such that the polyurethane rubber is not subject to a complete cure before combining with the thermoplastic. Curing of the polyurethane rubber is completed in the twin screw extruder after injection of the curative and prepolymer into the molten thermoplastic stream.

The compositions and articles of the invention will contain a sufficient amount of vulcanized elastomeric material ("rubber") to form a rubbery composition of matter, that is, they will exhibit a desirable combination of flexibility, softness, and compression set. Preferably, the compositions should comprise at least about 25 parts by weight rubber, preferably at least about 35 parts by weight rubber, even more preferably at least about 45 parts by weight rubber, and still more preferably at least about 50 parts by weight rubber per 100 parts by weight of the rubber and thermoplastic polymer combined. The amount of cured rubber within the thermoplastic vulcanizate is generally from about 5 to about 95 percent by weight, preferably from about 35 to about 90 percent by weight, and more preferably from about 50 to about 90 percent by weight, and more preferably from about 50 to about 80 percent by weight, based on the total weight of the rubber and the thermoplastic polymer combined.

The amount of thermoplastic polymer within the processable rubber compositions of the invention is generally from about 5 to about 95 percent by weight, preferably from about 15 to about 65 percent by weight and more preferably from about 20 to about 50 percent by weight of the total weight of the rubber and the thermoplastic combined.

As noted above, the processable rubber compositions and shaped articles of the invention include a cured rubber and a thermoplastic polymer. Preferably, the thermoplastic vulcanizate that makes up the composition and the shaped articles is a homogeneous mixture wherein the rubber is in the form of finely-divided and well-dispersed rubber particles within a non-vulcanized matrix. It should be understood, however, that the thermoplastic vulcanizates of the this invention are not limited to those containing discrete phases inasmuch as the compositions of this invention may also include other morphologies such as co-continuous morphologies. In especially preferred embodiments, the rubber particles have an average particle size smaller than about 50 μm, more preferably smaller than about 25 μm, even more preferably smaller than about 10 μm or less, and still more preferably smaller than about 5 μm.

Advantageously, in a preferred embodiment, the shaped articles of the invention, are rubber-like materials that, unlike conventional rubbers, can be processed and recycled like thermoplastic materials. These materials are rubber like to the extent that they will retract to less than 1.5 times their original length within one minute after being stretched at room temperature to twice its original length and held for one minute before release, as defined in ASTM D1566. Also, these materials satisfy the tensile set requirements set forth in ASTM D412, and they also satisfy the elastic requirements for compression set per ASTM D395.

The reprocessability of the rubber compositions of the invention may be exploited to provide a method for reducing the costs of a manufacturing process for making shaped rubber articles. The method involves recycling scrap generated during the manufacturing process to make other new shaped articles. Because the compositions of the invention and the shaped articles made from the compositions are thermally processable, scrap may readily be recycled for re-use by collecting the scrap, optionally cutting, shredding, grinding, milling, otherwise comminuting the scrap material, and re-processing the material by conventional thermoplastic techniques. Techniques for forming shaped articles from the recovered scrap material are in general the same as those used to form the shaped articles—the conventional thermoplastic techniques include, without limitation, blow molding, injection molding, compression molding, and extrusion.

The re-use of the scrap material reduces the costs of the manufacturing process by reducing the material cost of the method. Scrap may be generated in a variety of ways during a manufacturing process for making shaped rubber articles. For example, off-spec materials may be produced. Even when on-spec materials are produced, manufacturing processes for shaped rubber articles tend to produce waste, either through inadvertence or through process design, such as the material in sprues of injection molded parts. The re-use of such materials through recycling reduces the material and thus the overall costs of the manufacturing process.

For thermoset rubbers, such off spec materials usually can not be recycled into making more shaped articles, because the material can not be readily re-processed by the same techniques as were used to form the shaped articles in the first place. Recycling efforts in the case of thermoset rubbers are usually limited to grinding up the scrap and the using the grinds as raw material in a number products other than those produced by thermoplastic processing techniques.

The invention has been described above with respect to preferred embodiments. Further non-limiting description of the invention is given in the Examples that follow. The description of the invention is merely exemplary in nature and, thus, variations that do not depart from the gist of the invention are intended to be within the scope of the invention. Such variations are not to be regarded as a departure from the spirit and scope of the invention, the extent of which is set forth in the appended claims.

EXAMPLES

Examples 1–5 illustrate the curing of a hydroxyl functional urethane prepolymer in the presence of a thermoplastic elastomer containing blocks of polyamide and polyether. In examples 1–5, Noxtite MS-640S is a millable gum based on a prepolymer made from MDI and poly(butanediol adipate), commercially available from Unimatec Co. Ltd. of Japan. Pebax MX1205 is a thermoplastic elastomer containing blocks of polyamide and polyether, commercially available from Atofina. Dicumyl peroxide is added to Examples 1–5 as the curing agent.

In Examples 1–5, the Pebax MX1205, carbon black, and stearic acid are preheated in a Brabender mixer to a temperature of 180° C. to melt the thermoplastic. The Noxtite MS 640S millable gum is then added to the Brabender mixer, and premixed together with the Pebax material for a further 20 minutes at 30 rpm. Thereafter, the dicumyl peroxide curing agent is added to the stirred molten mixture, and heating and stirring continued for an additional 30 minutes. Cure is complete when the torque reading on the Brabender mixer reaches the steady state. The mixed rubber composition is then removed from the mixer and pressed on a hydraulic press to make plaques for physical property measurements.

Examples 1–5 show a series of reactions with increasing levels of Pebax MX1205 thermoplastic elastomer from 25 pphr (parts per hundred resin) to 125 pphr. Tensile strength measurements at 100° C. are also reported in Examples 1–5. Examples 1–5 demonstrate an improvement in the tensile strength at 100° C. as compared to the tensile strength of 100% cured polyurethane.

In Examples 6–10, Unimatec U801-P is an isocyanate-functional prepolymer based on a reaction product of TODI and polycaprolactone, available from Unimatec. Pebax MX1205 is the thermoplastic elastomer from Atofina described above, and Unimatec U801-C is a hardener available from Unimatec that consists of diol and triol components.

Examples 6–10 illustrate the curing of a castable polyurethane elastomer in the presence of a Pebax type thermoplastic elastomer. In Examples 6–10, the Unimatec U801-P prepolymer is premixed with the hardener Unimatec U801-C for one minute at 100° C. in a separate container to obtain a partially cured crosslinked polyurethane. The thermoplastic Pebax MX 1205 is melted in a Brabender mixture at 180° C. The partially cured polyurethane is poured into the molten thermoplastic elastomer in the Brabender batch mixture. The molten thermoplastic and partially cured polyurethane are mixed for about 15 to 20 minutes at about 30 rpm until a homogenous mixture is achieved and the polyurethane is completely cured, as indicated by a constant torque reading on the Brabender mixer.

| Ingredient | Example 1 | | Example 2 | | Example 3 | | Example 4 | | Example 5 | |
|---|---|---|---|---|---|---|---|---|---|---|
| | pphr | g | pphr | g | pphr | g | pphr | g | pphr | g |
| Noxtite MS-640S | 100.0 | 133.0 | 100.0 | 116.3 | 100.0 | 103.3 | 100.0 | 92.9 | 100.0 | 84.4 |
| Pebax MX1205 | 25.0 | 33.3 | 50.0 | 58.1 | 75.0 | 77.5 | 100.0 | 92.9 | 125.0 | 105.5 |
| HAF Carbon Black | 40.0 | 59.9 | 45.0 | 52.3 | 45.0 | 46.5 | 45.0 | 41.8 | 45.0 | 38.0 |
| Stearic Acid | 0.2 | 0.3 | 0.2 | 0.2 | 0.2 | 0.2 | 0.2 | 0.2 | 0.2 | 0.2 |
| Dicumyl Peroxide | 3.5 | 4.7 | 3.5 | 4.1 | 3.5 | 3.6 | 3.5 | 3.3 | 3.5 | 3.0 |
| Tensile Strength at 100° C. (MPa) | | 8.33 | | 8.81 | | 7.89 | | 8.72 | | 9.3 |

| Ingredient | Example 6 | | Example 7 | | Example 8 | | Example 9 | | Example 10 | |
|---|---|---|---|---|---|---|---|---|---|---|
| | pphr | G | pphr | G | pphr | g | pphr | g | pphr | g |
| Unimatec U801-P | 100.0 | 174.3 | 100.0 | 146.6 | 100.0 | 126.5 | 100.0 | 111.3 | 100.0 | 99.3 |
| Pebax MX1205 | 25.0 | 43.6 | 50.0 | 73.3 | 75.0 | 94.9 | 100.0 | 111.3 | 125.0 | 124.2 |
| Unimatec U801-C | 7.6 | 13.2 | 7.6 | 11.1 | 7.6 | 9.6 | 7.6 | 8.5 | 7.6 | 7.5 |
| Tensile Strength 100° C. (MPa) | 0.2 | 16.98 | | 15.64 | | 14.42 | | 14.98 | | 11.75 |

We claim:

1. A method for making a thermoplastically processable rubber composition, comprising:
   combining a liquid urethane prepolymer, a curing agent capable of reacting with the urethane prepolymer, and a thermoplastic material to form a mixture; and
   heating the mixture at a temperature and for a time sufficient to effect reaction between the curing agent and the prepolymer, wherein the mechanical energy is supplied to the mixture during the heating step;
   wherein the liquid urethane prepolymer is the reaction product of a polyisocyanate and a polyol or amine, and the thermoplastic material comprises a polymeric material that softens and flows upon heating.

2. A method according to claim 1 comprising:
   mixing the prepolymer and the thermoplastic material in the presence of the curing agent; and
   heating during the mixing step to effect cure of the prepolymer.

3. A method according to claim 1 comprising:
   mixing the prepolymer and the thermoplastic material for a time and at a shear rate sufficient to form a dispersion of the prepolymer in a continuous thermoplastic phase;
   adding the curing agent to the dispersion while continuing the mixing; and
   heating while continuing to mix the curing agent, prepolymer, and thermoplastic material.

4. A method according to claim 1, wherein the curing agent comprises a polyol of functionality greater than 2.

5. A method according to claim 1, wherein the curing agent comprises a polyol with a functionality of approximately 2.

6. A method according to claim 1, wherein the curing agent comprises a polyisocyanate.

7. A method according to claim 1, wherein the curing agent comprises a peroxide.

8. A method according to claim 1, carried out in a batch process.

9. A method according to claim 1, carried out in a continuous process.

10. A method according to claim 9, carried out in a twin screw extruder.

11. A method according to claim 10, comprising melting the thermoplastic in the screw extruder and injecting the prepolymer with a liquid injector into the molten thermoplastic.

* * * * *